United States Patent
Jin et al.

(10) Patent No.: US 11,227,137 B2
(45) Date of Patent: Jan. 18, 2022

(54) SENSOR PIXEL AND FINGERPRINT SENSING SENSOR INCLUDING THE SAME

(71) Applicant: SILICON DISPLAY TECHNOLOGY, Yongin-si (KR)

(72) Inventors: Jong Woo Jin, Seoul (KR); Jin Hyeong Yu, Yongin-si (KR); Kwanwon Lim, Yongin-si (KR); Youn Duck Nam, Suwon-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 0 days.

(21) Appl. No.: 17/082,178

(22) Filed: Oct. 28, 2020

(65) Prior Publication Data

US 2021/0142025 A1    May 13, 2021

(30) Foreign Application Priority Data

Nov. 7, 2019 (KR) .......................... 10-2019-0141949

(51) Int. Cl.
*G06K 9/00* (2006.01)

(52) U.S. Cl.
CPC .................................. *G06K 9/0002* (2013.01)

(58) Field of Classification Search
CPC . G06K 9/0002; G06F 3/0446; G06F 3/04164; G06F 3/04166; G06F 2203/04105
See application file for complete search history.

(56) References Cited

FOREIGN PATENT DOCUMENTS

| KR | 10-1210473 | 12/2012 |
|---|---|---|
| KR | 10-1296579 | 8/2013 |
| KR | 10-2014-0123612 | 10/2014 |
| KR | 10-1596377 | 2/2016 |
| KR | 10-1920871 | 11/2018 |
| KR | 10-1944059 | 1/2019 |
| KR | 10-2019-0059672 | 5/2019 |

*Primary Examiner* — Edward F Urban
*Assistant Examiner* — Wassim Mahrouka
(74) *Attorney, Agent, or Firm* — Lex IP Meister, PLLC (57) ABSTRACT

A sensor pixel according to a feature of the present invention includes: a detection electrode that forms capacitance with a recognition target; and a sensor pixel circuit that is connected to the detection electrode, generates a detection signal by using the detection electrode, and to which a DC voltage for resetting is supplied, wherein a coupling pulse is periodically applied to the recognition target that forms the capacitance with the detection electrode, and the detection signal may be changed according to the coupling pulse.

16 Claims, 6 Drawing Sheets

SENSOR PIXEL AND FINGERPRINT SENSING SENSOR INCLUDING THE SAME

CROSS-REFERENCE TO RELATED APPLICATION

This application claims priority to and the benefit of Korean Patent Application No. 10-2019-0141949 filed in the Korean Intellectual Property Office on Nov. 7, 2019, the entire contents of which are incorporated herein by reference.

BACKGROUND

(a) Technical Field

The present disclosure relates to a sensor pixel and a sensor including the same.

(b) Description of the Related Art

As a layer protecting a surface of a sensor becomes thicker, capacitance between a recognition target and a sensor pixel becomes smaller, and thus it becomes difficult to detect the recognition target. It is difficult to detect the recognition target when the sensor surface contains foreign materials other than the recognition target.

When electrostatic discharge (ESD) is applied to an upper portion of the sensor, a higher voltage than a normal driving range may be applied to an electrode for detecting the recognition target. Due to a high voltage applied to the detection electrode, a current may flow to an IC that drives the sensor pixel. This may cause malfunction or even damage of the driving IC.

The above information disclosed in this Background section is only for enhancement of understanding of the background of the invention, and therefore it may contain information that does not form the prior art that is already known in this country to a person of ordinary skill in the art.

SUMMARY

The present disclosure provides a sensor pixel that is strong to electrostatic discharge (ESD) and a sensor including the same to thereby improve detection performance of the sensor.

A sensor pixel according to a feature of the present invention includes: a detection electrode that forms capacitance with a recognition target; and a sensor pixel circuit that is connected to the detection electrode, generates a detection signal by using the detection electrode, and to which a DC voltage for resetting is supplied, wherein a coupling pulse is periodically applied to the recognition target that forms the capacitance with the detection electrode, and the detection signal may be changed according to the coupling pulse.

A sensor according to another feature of the present invention includes: a detection electrode that forms capacitance with a recognition target, and a plurality of sensor pixels that are connected to the detection electrode and generate a detection signal by using the detection electrode; and a configuration that applies a coupling pulse by contacting the recognition target, wherein the sensor supplies a DC voltage to the plurality of sensor pixels for resetting, and the detection signal may be changed according to the coupling pulse.

The sensor pixel circuit may include: a first transistor that includes one end connected to a driving voltage, and outputs the detection signal that depends on a gate voltage by being synchronized by an on level of a first scan signal; and a second transistor that includes one end to which the DC voltage is input and the other end connected to the detection electrode, and performs switching according to a second scan signal.

The sensor pixel circuit may include: a fourth transistor that is connected between a gate of the first transistor and the driving voltage; a third transistor that includes one end to which the DC voltage is input and the other end connected to the gate of the first transistor, and performs switching according to the second scan signal; and a storage capacitor that is connected between the gate of the first transistor and the driving voltage.

The sensor pixel circuit may further include a coupling capacitor that is connected between the DC voltage and the detection electrode.

The second scan signal may become an on level before the first scan signal becomes an on level.

The DC voltage may have a ground level.

Intensity of the detection signal may be adjusted according to the DC voltage.

The detection signal may be adjusted according to a pulse size of the coupling pulse.

The detection signal may be adjusted according to the driving voltage.

According to the exemplary embodiments, a sensor pixel that is strong to the ESD, and a sensor that includes the sensor pixel that is strong to the electrostatic discharge (ESD) can be provided to improve detection performance of the sensor.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
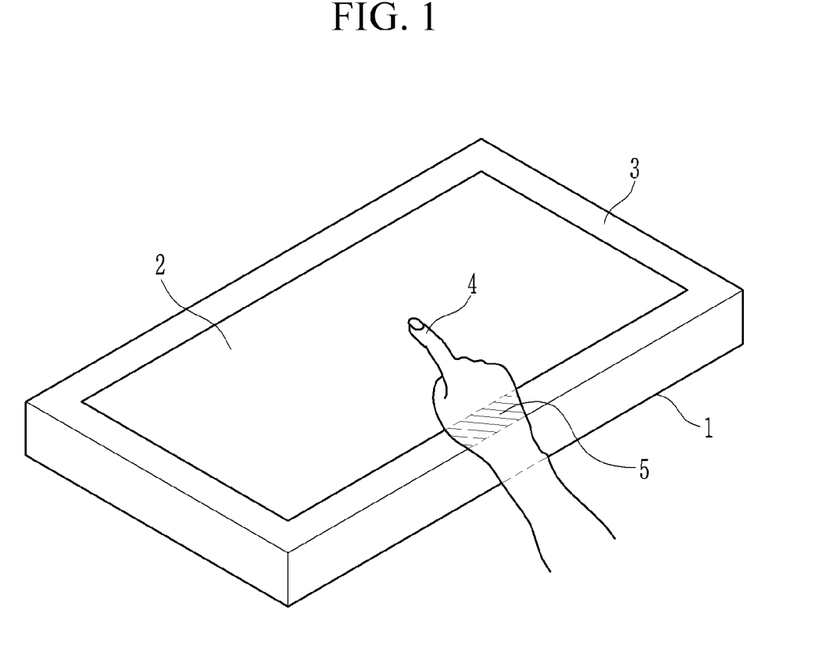
FIG. 1 shows a sensor according to an exemplary embodiment.

FIG. 1 shows a sensor according to an exemplary embodiment.

As shown in FIG. 1, a sensor 1 includes a sensor screen 2 and a bezel 3. A plurality of sensor pixels are provided in the sensor screen 2, and the bezel 3 surrounds the sensor screen 2.

A coupling pulse is applied to the bezel 3, and when a recognition target is a fingerprint, while a finger 4 contacts the sensor screen 2, an upper surface of the bezel 3 and a hand contact at least part of an area 5, and a pulse voltage may be applied to the fingerprint of the finger 4 through a corresponding contact area. In the exemplary embodiment, the bezel 3 is used as a means for supplying a coupling pulse to a recognition target, but the invention is not limited thereto. The coupling pulse may be supplied through a means that can be electrically connected to the recognition target.

Figure 2:
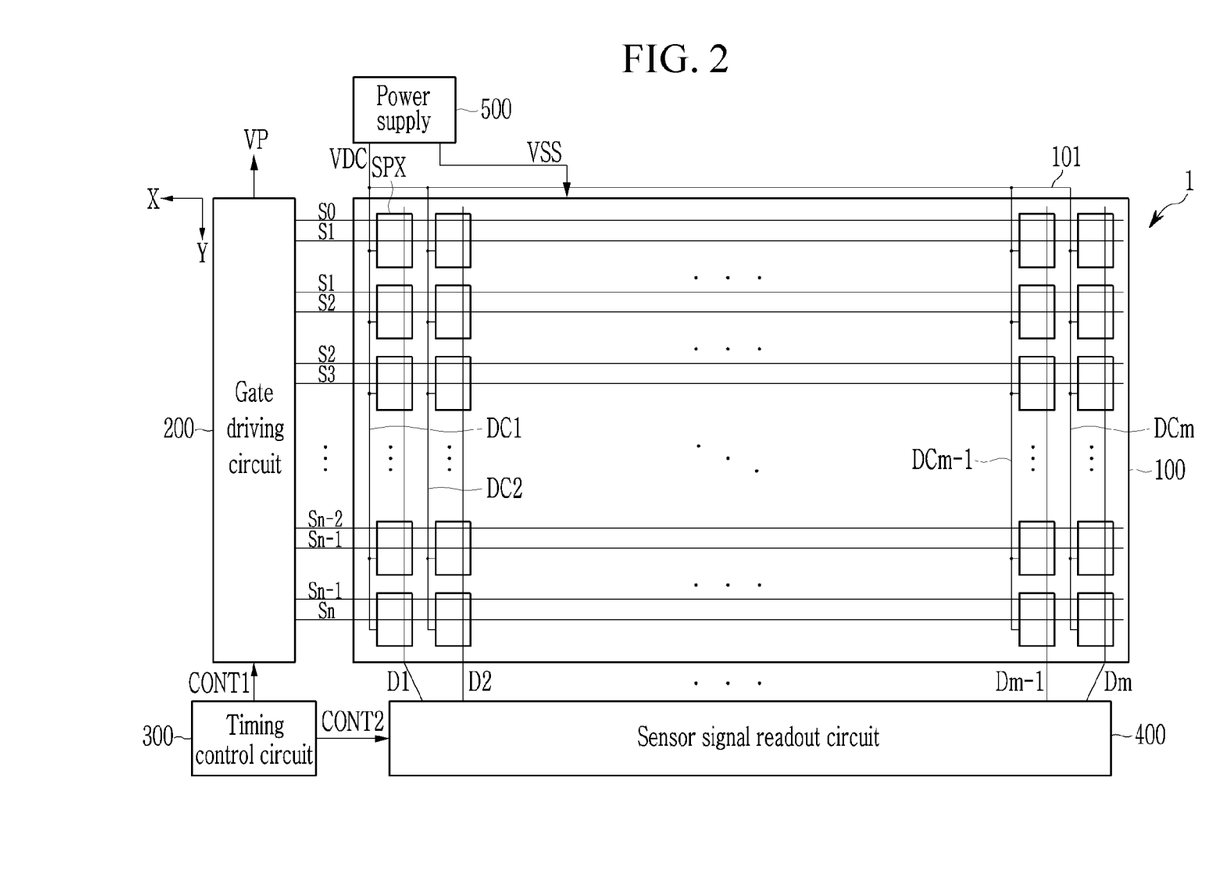
FIG. 2 shows a configuration of another sensor according to the exemplary embodiment.

FIG. 2 shows a configuration of another sensor according to the exemplary embodiment.

Figure 3:
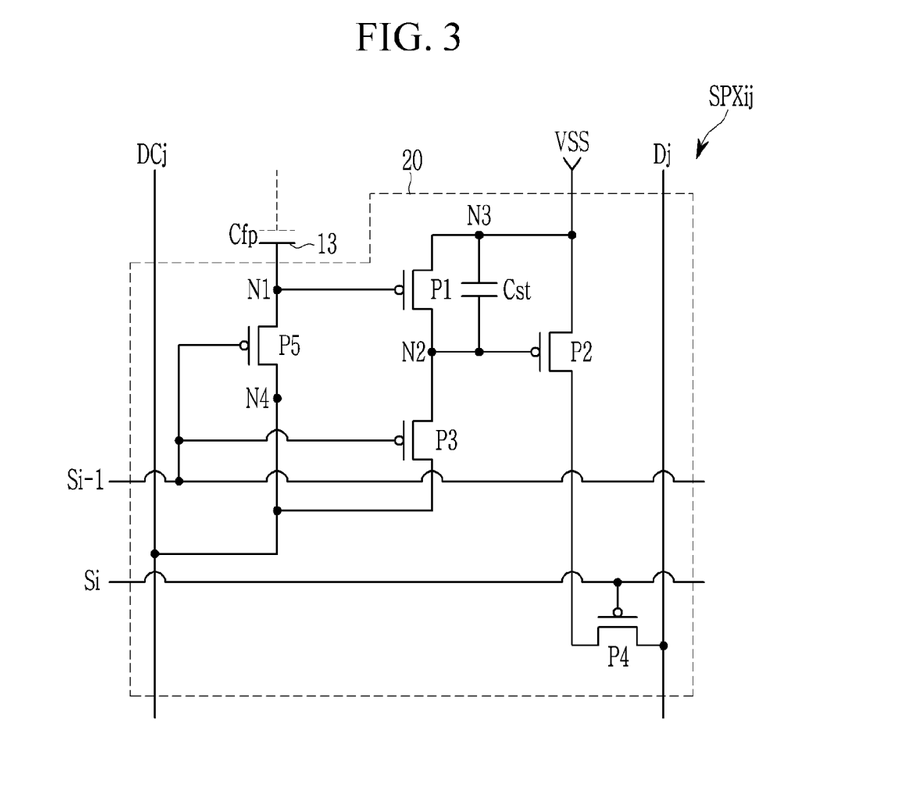
FIG. 3 shows a sensor pixel circuit according to the exemplary embodiment.

FIG. 3 shows a sensor pixel circuit according to the exemplary embodiment.

As shown in FIG. 2, the sensor 1 includes a sensor panel 100, a scan circuit 200, a timing control circuit 300, a sensor signal readout circuit 400, and a power supply 500.

The sensor panel 100 includes a plurality of scan lines S0 to Sn, a plurality of data lines D1 to Dm, a plurality of DC voltage lines DC1 to DCm, and a plurality of sensor pixels SPX.

The plurality of sensor pixels SPX may be implemented as a sensor pixel SPX shown in FIG. 3.

The plurality of scan lines S0 to Sn extend in a first direction (X direction in FIG. 2), and are arranged in a second direction (Y direction in FIG. 2) that crosses the first direction. Scan signals respectively corresponding to a plurality of sensor pixel rows are transmitted through the plurality of scan lines S0 to Sn.

In FIG. 2, it is illustrated that two scan lines correspond to one sensor pixel row because each of the sensor pixels operates according to two corresponding scan signals. However, the present invention is not limited thereto, and the number of scan lines connected to one sensor pixel row may be changed according to a scan signal required to operate a sensor pixel.

The plurality of DC voltage lines DC1 to DCm are connected to a voltage line 101 to which a DC voltage VDC is supplied and thus extend in the second direction, and are arranged in the first direction that crosses the first direction. An extension direction and an alignment direction of the plurality of DC voltage lines are not limited to the extension direction and the alignment direction shown in FIG. 2. For example, the plurality of DC voltage lines DC1 to DCm may extend in the first direction, and may be arranged in the second direction.

A corresponding DC voltage VCD is transmitted to each of the plurality of sensor pixel rows through the plurality of DC voltage lines DC1 to DCm. The DC voltage VDC may be set to an appropriate level for resetting a gate voltage of a transistor (e.g., P1 and P2 of FIG. 3) of the sensor pixel SPX. Reset refers to the operation of setting the gate voltage of the transistor written in the previous frame to the DC voltage VDC.

The power supply 500 generates and supplies a DC voltage VDC according to a level of a predetermined DC voltage VDC, and generates and supplies a voltage VSS for driving a sensor pixel circuit. When the DC voltage VDC is a ground level, the voltage line 101 may be connected to the ground instead of the power supply 500.

The power supply 500 may control intensity of a sense signal generated by the sensor pixel by adjusting a level of the DC voltage VDC. In addition, the power supply 500 may control intensity of a sense signal generated by the sensor pixel by adjusting a level of a voltage VSS. For example, in FIG. 3, as the supplied voltage VSS is decreased to a negative voltage, the intensity of the sense signal supplied to the data line Dj may be increased.

A plurality of data lines D1 to Dm extend in the second direction, and are arranged in the first direction. A data signal of each of the plurality of sensor pixels is transmitted to the sensor signal readout circuit 400 through the plurality of data lines D1 to Dm. Each of the plurality of sensor pixels SPX is connected to two corresponding scan lines, a data line, and a DC voltage line. Each of the plurality of sensor pixels SPX is reset by being synchronized by a scan signal transmitted through one of the two corresponding scan lines. In each of the plurality of sensor pixels SPX, gate voltages of the transistors P1 and P3 are reset according to the DC voltage VCD transmitted through the respective DC voltage lines, and the sensor pixel SPX is synchronized by a scan signal transmitted through the other one of the two corresponding scan lines and thus a data signal may be transmitted through a corresponding data line.

The scan circuit 200 generates a plurality of scan signals, and transmits the scan signals to a plurality of scan lines S0 to Sn. In addition, the scan circuit 200 may transmit a coupling pulse VP to the bezel 3. The coupling pulse VP may be a signal having a pulse waveform of a predetermined level for every horizontal cycle. Although it is illustrated in FIG. 2 that the scan circuit 200 generates the coupling pulse VP, the present invention is not limited thereto, and a separate configuration may generate the coupling pulse VP.

The coupling pulse VP according to the exemplary embodiment is synchronized at an on-time (e.g., a falling edge time) of each of the plurality of scan signals (scan signals transmitted through a plurality of scan lines Si), and may maintain an on level (e.g., a low level) for a predetermined time period. The on-level period of the coupling pulse VP may be shorter than the on-level period of the corresponding scan signal. The intensity of the sense signal generated by the sensor pixel SPX may be adjusted according to the pulse width of the coupling pulse VP.

The sensor signal readout circuit 400 receives a plurality of data signals transmitted through the plurality of data lines D1 to Dm, and may generate information on a detected fingerprint according to the plurality of data signals.

The timing control circuit 300 may generate control signals CONT1 and CONT2 that are required to control operation of the scan circuit 200 and the sensor signal readout circuit 400.

The scan circuit 200 may generate a plurality of scan signals and the coupling pulse VP according to the control signal CONT1. The sensor signal readout circuit 400 is synchronized and receives a plurality of data signals at a time when the plurality of data signals are transmitted through the plurality of data lines D1 to Dm according to the control signal CONT2, and may perform a signal process for generating information on the recognized fingerprint.

In FIG. 3, a sensor pixel SPX located at an i-th row and a j-th column is illustrated. A sensor pixel SPX at another position also includes the same configuration shown in FIG. 3, and constituent elements may be connected to each other as shown in FIG. 3.

The sensor pixel SPX according to the exemplary embodiment includes a detection electrode 13 and a sensor pixel circuit 20.

The sensor pixel circuit 20 includes five transistors P1 to P5 and a storage capacitor Cst.

The detection electrode 13 is an electrode for sensing an area corresponding to the fingerprint. A detection capacitor Cfp is formed when a fingerprint contact occurs on the detection electrode 13. A gate of the transistor P1 is connected to a node N1, and opposite ends of the transistor P1 are connected between a node N2 and a node N3. A gate of the transistor P2 is connected to the node N2, and opposite ends of the transistor P2 are connected between the node N3 and a source electrode of the transistor P4. The transistor P2 outputs a current or a voltage according to a voltage of the node N2, that is, a gate voltage VG2, and the current or voltage output by the transistor P2 is a detection signal indicating a recognition result.

A gate of the transistor P3 is connected to a scan line Si-1 and opposite ends of the transistor P3 are connected between the node N2 and a node N4. A gate of the transistor P4 is connected to a scan line Si, and a drain of the transistor P4 is connected to a data line Dj. A gate of the transistor P5 is connected to the scan line Si-1, and opposite ends of the transistor P5 are connected between the node N1 and the node N4. The detection electrode 10 is connected to the node N1, and the storage capacitor Cst is connected between the node N2 and the node N3. The voltage VSS is supplied to the node N3. The voltage VSS is a voltage level for driving a sensor pixel circuit, and it may be a negative voltage in the exemplary embodiment.

The transistor P5 and the transistor P3 are turned on, and thus the gate of the transistor P1 and the gate of the transistor P2 are reset by a DC voltage VDC.

The node N1 is coupled to a recognition target through a detection capacitor Cfp. As shown in FIG. 1, when the recognition target is a fingerprint of the finger 4, the node N1 is coupled with the fingerprint through the detection capacitor Cfp. When the coupling pulse VP decreases to the on level, a voltage decrease amount of the coupling pulse VP is divided by the capacitor Cfp and a parasitic capacitor (not shown) and thus a voltage of the node N1 is decreased.

The storage capacitor Cst may maintain a gate voltage of the transistor P2, determined according to a current flowing to the transistor P1 or a voltage output through the transistor P1.

The transistor P4 is turned on by a corresponding scan signal (e.g., a scan signal transmitted through the scan line Si). Then, a current flowing to the transistor P2 is transmitted to the sensor signal readout circuit 400 through the data signal Dj as a data signal.

Figure 4:
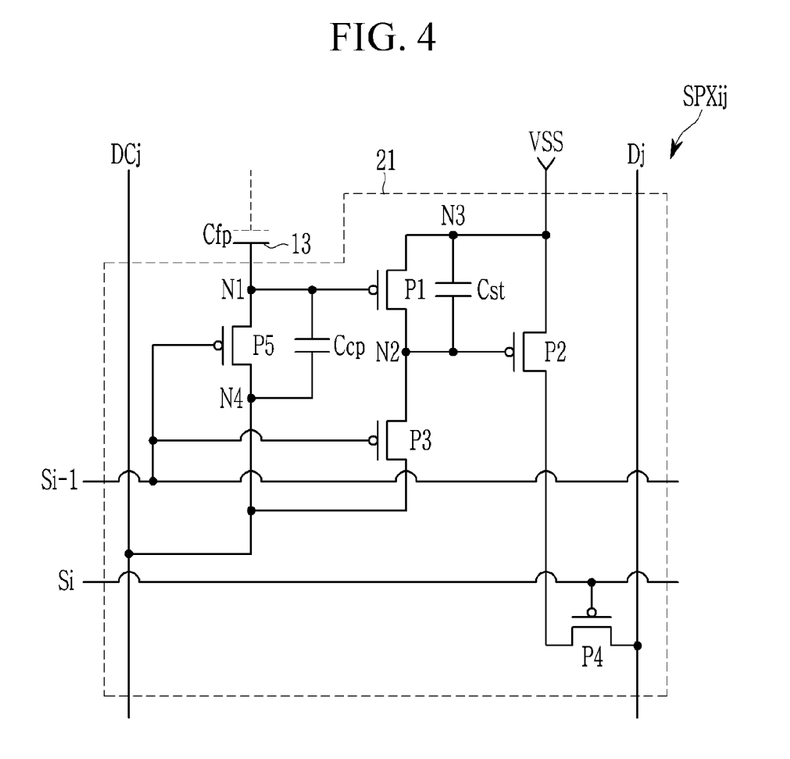
FIG. 4 shows a sensor pixel circuit according to another exemplary embodiment.

FIG. 4 shows a sensor pixel circuit according to another exemplary embodiment.

Compared to the sensor pixel shown in FIG. 3, a sensor pixel circuit 21 includes a coupling capacitor Ccp. The coupling capacitor Ccp is connected between the node N1 and the node N4.

The node N1 is coupled to the finger 4 through the detection capacitor Cfp. When the coupling pulse VP decreases to the on level, a voltage decrease amount of the coupling pulse VP is divided by two capacitors Cfp and Ccp and a parasitic capacitor (not shown) and thus a voltage of the node N1 is decreased.

The coupling capacitor Ccp may be added to control intensity of a signal supplied to a data line Dj through the transistor P4. For example, when the coupling capacitor Ccp is added and thus capacitance is increased, compared to a case that the coupling capacitor Ccp is not provided, a decrease amount of a gate voltage of the transistor P1 due to the coupling pulse VP is reduced, and thus the signal to the data line Dj decreases through the transistor P2. As the capacitance of the coupling capacitor Ccp is increased, the decrease amount of the gate voltage of the transistor P1 due to the coupling pulse VP is decreased such that the signal transmitted to the data line Dj may be decreased through the transistor P2.

Figure 5:
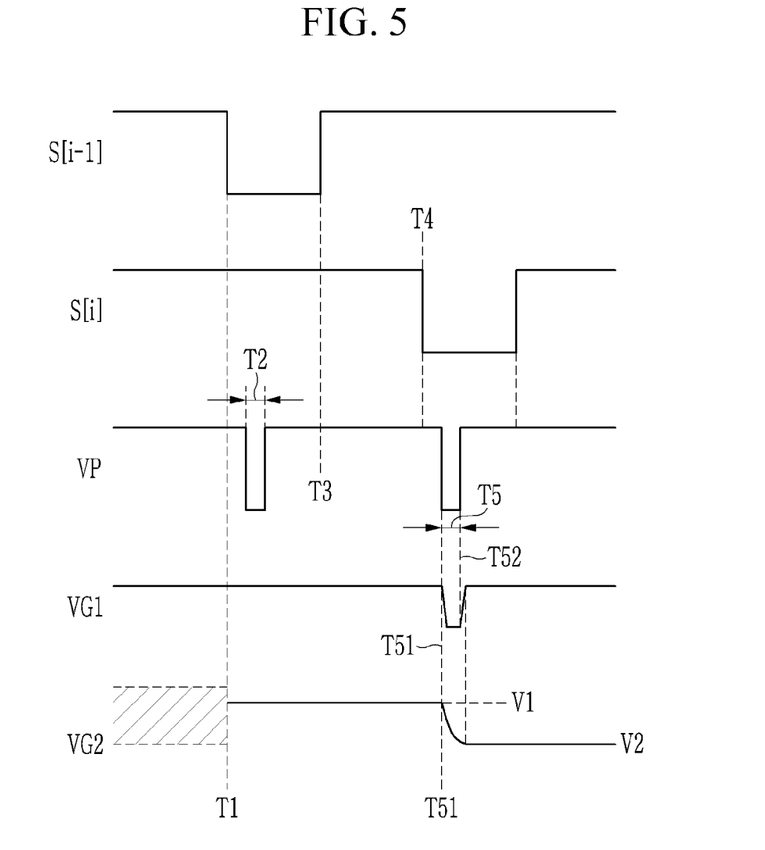
FIG. 5 is a waveform diagram of a scan signal, a coupling pulse, and a gate voltage of a transistor according to the exemplary embodiment when a recognition target is in contact.

FIG. 5 is a waveform diagram of a scan signal, a coupling pulse, and a gate voltage of a transistor according to the exemplary embodiment when a recognition target is in contact.

Specifically, a recognition target is a fingerprint of a finger, and FIG. 5 may be a waveform diagram of a case that ridges of the fingerprint contact a corresponding sensor pixel SPXij.

At a time T1, a scan signal S[I-1] transmitted to a scan line Si-1 is decreased to a low level, which is an on level. Then, the transistor P3 and the transistor P5 are turned on and a DC voltage VDC is supplied to the node N1 and the node N2, and thus a gate voltage VG1 of the transistor P1 and a gate voltage VG2 of the transistor P2 are reset to the level of the DC voltage VDC.

The gate voltage VG1 of the transistor P1 and the gate voltage VG2 of the transistor P2 before the time T1 respectively have voltage levels that are determined in a previous frame, and when the gate voltages VG1 and VG2 are reset by being synchronized by the scan signal S[I-1], the gate voltages VG1 and VG2 are reset to the DC voltage VDC regardless of the voltage level that is determined in the previous frame. In FIG. 5, the gate voltage VG1 is shown to be the same voltage as an initialization voltage, but the invention is not limited thereto. For the gate voltage VG2, the voltage level determined in the previous frame is not specified, but is shown as a shaded area.

During a period T2, a coupling pulse VP of a low level is supplied to a bezel 3 such that a voltage of the finger 4 is decreased according to the low level of the coupling pulse VP. Since a node N1 of the corresponding sensor pixel SPXij is supplied with the DC voltage VDC, as shown in FIG. 5, the coupling pulse VP may not affect the voltage level of the node N1.

At a time T3, the scan signal S[I-1] is increased to a high level, which is an off level, and the transistor P3 and the transistor P5 are turned off.

At a time T4, a scan signal S[I] transmitted to a scan line Si is decreased to the low level, which is the on level. Then, the transistor P4 is turned on, a current flowing to the transistor P2 or a voltage transmitted through the transistor P2 is transmitted to a sensor signal readout circuit 400 through the data line Dj.

During a period T5 after the time T4, the coupling pulse VP of the low level is supplied to the bezel 3 and thus the voltage of the finger 4 is decreased according to the low level of the coupling pulse VP. Then, from a time T51, the gate voltage VG1 is decreased according to the low level of the coupling pulse VP, and the degree of conduction of the transistor P1 increases such that a storage capacitor Cst is discharged and the gate voltage VG2 of the transistor P2 starts to decrease. At a time T52, the coupling pulse VP is increased to a high level and the gate voltage VG1 is increased according to the high level of the coupling pulse VP, and the degree of the conduction of the transistor P1 is decreased and thus discharge of the storage capacitor Cst is reduced. After a time T52, the gate voltage VG2 converges to a voltage of a predetermined level.

A level V1 of the gate voltage VG2 is adjusted according to the level of the DC voltage VDC, and a level V2 of the gate voltage VG2 is adjusted according to the voltage VSS or a pulse width of the coupling pulse VP. As described, a current or a voltage transmitted to the data line through the transistor P4, that is, the intensity of the detection signal, is adjusted according to the gate voltage range of transistor P2.

Figure 6:
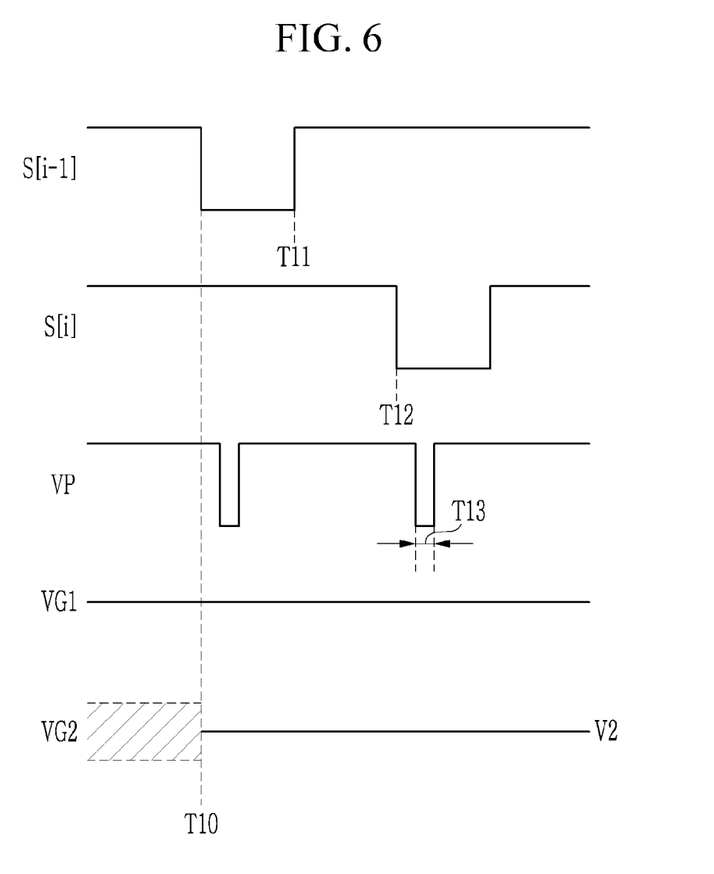
FIG. 6 is a waveform diagram of a scan signal, a coupling pulse, and a gate voltage of a transistor according to an exemplary embodiment when a recognition target is not in contact.

FIG. 6 is a waveform diagram of a scan signal, a coupling pulse, and a gate voltage of a transistor according to an exemplary embodiment when a recognition target is not in contact.

Specifically, a recognition target is a fingerprint of a finger, and FIG. 5 may be a waveform of a case that valleys of the fingerprint contact a corresponding sensor pixel. Since the operation of the periods T1 to T3 in the preceding description with reference to FIG. 5 and the operation of the periods T10 and T11 of FIG. 6 are the same, the detailed description is omitted.

At a time T11, a scan signal S[I-1] is increased to a high level, which is an off level, and a transistor P3 and a transistor P5 are turned off.

At a time T12, a scan signal S[I] transmitted to a scan line Si is decreased to a low level, which is an on level. Then, a transistor P4 is turned on, and thus a current flowing to the transistor P2 and a voltage transmitted through the transistor P2 is transmitted to a sensor signal readout circuit 400 through a data line Dj.

During a period T13 after a time T12, a coupling pulse VP of a low level is supplied to a bezel 3, and thus a voltage of a fingerprint of the finger 4 is decreased according to the low level of the coupling pulse VP. However, in case of the valley of the fingerprint, capacitance of the z detection capacitor Cfp is so small that substantially the coupling pulse VP does not affect a gate voltage VG1. As shown in FIG. 6, during the period T13, the gate voltage VG1 does not change the voltage enough to conduct the transistor P1. Therefore, the voltage of the gate voltage VG2 is also unchanged.

The coupling pulse VP according to the exemplary embodiment is not supplied within a sensor pixel circuit, but is directly applied to a recognition target, and thus a voltage range is relatively low. Accordingly, even in a condition in which the capacitance of the detection capacitor Cfp is decreased due to thickening of a protective layer of a sensor surface, a sensor according to the exemplary embodiment can compensate for the decrease in the capacitance of the detection capacitor Cfp by increasing the voltage range of the coupling pulse VP.

In addition, although a foreign material is adhered to the sensor surface other than the recognition target, a coupling pulse is not applied to the material, and thus the foreign material is not detected. Only targets to which the coupling pulse is applied can be detected.

In addition, when an electrostatic discharge (ESD) is applied to an upper portion of the sensor, the coupling pulse in the sensor pixel circuit is susceptible to the ESD. Since the DC voltage is supplied in the sensor pixel circuit in the exemplary embodiment, the sensor pixel circuit may be stronger against ESD than a sensor pixel circuit to which the pulse waveform is applied.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: sensor
2: sensor screen
3: bezel
100: sensor panel
200: scan circuit
300: timing control circuit
400: sensor signal readout circuit
500: power supply

What is claimed is:

1. A sensor pixel comprising:
a detection electrode that forms capacitance with a recognition target; and
a sensor pixel circuit that is connected to the detection electrode, generates a detection signal by using the detection electrode, and to which a DC voltage for resetting is supplied,
wherein a coupling pulse is periodically applied to the recognition target that forms the capacitance with the detection electrode, and the detection signal is changed according to the coupling pulse, and
the sensor pixel circuit comprises:
a first transistor that includes one end connected to a driving voltage, and outputs the detection signal that depends on a gate voltage by being synchronized by an on level of a first scan signal; and
a second transistor that includes one end to which the DC voltage is input and the other end connected to the detection electrode, and performs switching according to a second scan signal.

2. The sensor pixel of claim 1, wherein the sensor pixel circuit comprises:
a fourth transistor that is connected between a gate of the first transistor and the driving voltage;
a third transistor that includes one end to which the DC voltage is input and the other end connected to the gate of the first transistor, and performs switching according to the second scan signal; and
a storage capacitor that is connected between the gate of the first transistor and the driving voltage.

3. The sensor pixel of claim 2, wherein the sensor pixel circuit further comprises a coupling capacitor that is connected between the DC voltage and the detection electrode.

4. The sensor pixel of claim 1, wherein the second scan signal becomes an on level before the first scan signal becomes an on level.

5. The sensor pixel of claim 1, wherein the DC voltage has a ground level.

6. The sensor pixel of claim 1, wherein intensity of the detection signal is adjusted according to the DC voltage.

7. The sensor pixel of claim 1, wherein the detection signal is adjusted according to a pulse size of the coupling pulse.

8. The sensor pixel of claim 1, wherein the detection signal is adjusted according to the driving voltage.

9. A sensor comprising:
a detection electrode that forms capacitance with a recognition target, and a plurality of sensor pixels that are connected to the detection electrode and generate a detection signal by using the detection electrode; and
a configuration that applies a coupling pulse by contacting the recognition target,
wherein the sensor supplies a DC voltage to the plurality of sensor pixels for resetting, and the detection signal is changed according to the coupling pulse,
each of the plurality of sensor pixel circuits comprises:
a first transistor that includes one end connected to a driving voltage, and outputs the detection signal that depends on a gate voltage by being synchronized by an on level of a first scan signal; and a second transistor that includes one end to which the DC voltage is input and the other end connected to the detection electrode, and performs switching according to a second scan signal.

10. The sensor of claim 9, wherein each of the plurality of sensor pixel circuits comprises:
   a fourth transistor that is connected between a gate of the first transistor and the driving voltage;
   a third transistor that includes one end to which the DC voltage is input and the other end connected to the gate of the first transistor, and performs switching according to the second scan signal; and
   a storage capacitor that is connected between the gate of the first transistor and the driving voltage.

11. The sensor of claim 10, wherein each of the plurality of sensor pixel circuits further comprises a coupling capacitor that is connected between the DC voltage and the detection electrode.

12. The sensor of claim 9, wherein the second scan signal becomes an on level before the first scan signal becomes an on level.

13. The sensor of claim 9, wherein the DC voltage has a ground level.

14. The sensor of claim 9, wherein intensity of the detection signal is adjusted according to the DC voltage.

15. The sensor of claim 9, wherein the detection signal is adjusted according to a pulse size of the coupling pulse.

16. The sensor of claim 9, wherein the detection signal is adjusted according to the driving voltage.

* * * * *